United States Patent
Kim et al.

(10) Patent No.: US 9,698,406 B2
(45) Date of Patent: Jul. 4, 2017

(54) ELECTRODE ASSEMBLY HAVING EXCELLENT ELECTRODE TAB CONNECTIVITY AND BATTERY CELL AND DEVICE INCLUDING ELECTRODE ASSEMBLY

(71) Applicant: LG Chem, Ltd., Seoul (KR)

(72) Inventors: Young-Hoon Kim, Daejeon (KR);
Sung-Jin Kwon, Daejeon (KR);
Soon-Ho Ahn, Daejeon (KR);
Dong-Myung Kim, Daejeon (KR);
Ki-Woong Kim, Daejeon (KR);
Seung-Min Ryu, Daejeon (KR)

(73) Assignee: LG Chem, Ltd. (KR)

(*) Notice: Subject to any disclaimer, the term of this patent is extended or adjusted under 35 U.S.C. 154(b) by 556 days.

(21) Appl. No.: 14/149,047

(22) Filed: Jan. 7, 2014

(65) Prior Publication Data
US 2014/0120397 A1    May 1, 2014

Related U.S. Application Data

(63) Continuation of application No. PCT/KR2013/004751, filed on May 30, 2013.

(30) Foreign Application Priority Data

May 30, 2012  (KR) .................. 10-2012-0057583
Nov. 9, 2012  (KR) .................. 10-2012-0127001
May 30, 2013  (KR) .................. 10-2013-0061580

(51) Int. Cl.
*H01M 2/26*    (2006.01)
*H01M 10/052*    (2010.01)
(Continued)

(52) U.S. Cl.
CPC ............ *H01M 2/266* (2013.01); *H01M 2/26* (2013.01); *H01M 10/052* (2013.01);
(Continued)

(58) Field of Classification Search
CPC ....................................... H01M 2/26
See application file for complete search history.

(56) References Cited

U.S. PATENT DOCUMENTS 6,224,995 B1    5/2001    Fauteux et al.
6,709,785 B2    3/2004    Lee et al.
(Continued)

FOREIGN PATENT DOCUMENTS

CN    1363121 A    8/2002
CN    1363122 A    8/2002
(Continued)

OTHER PUBLICATIONS

KR20030066960MT.*
(Continued)

*Primary Examiner* — Alex Usyatinsky
(74) *Attorney, Agent, or Firm* — Lerner, David, Littenberg, Krumholz & Mentlik, LLP (57) ABSTRACT

An electrode assembly and a method of manufacturing the same are provided. The electrode assembly includes an electrode stack including at least one anode, at least one cathode, and at least one separation film and a plurality of cathode tabs and a plurality of anode tabs for electrically connecting the electrode stack. In this case, the electrode tabs are arranged to allow the electrode tabs having the same polarity to be electrically connected to one another while a portion of the electrode tabs having the same polarity are arranged so as not to overlap one another on the same plane.

11 Claims, 8 Drawing Sheets

(51) Int. Cl.
*H01M 10/0585* (2010.01)
*H01M 10/0587* (2010.01)
*H01M 10/058* (2010.01)
*H01M 10/04* (2006.01)

(52) U.S. Cl.
CPC ..... *H01M 10/058* (2013.01); *H01M 10/0585* (2013.01); *H01M 10/0587* (2013.01); *H01M 10/045* (2013.01); *H01M 10/0413* (2013.01); *H01M 10/0431* (2013.01); *Y10T 29/49208* (2015.01)

(56) References Cited

U.S. PATENT DOCUMENTS

| | | | |
|---|---|---|---|
| 6,726,733 B2 | 4/2004 | Lee et al. | |
| 8,765,307 B2 | 7/2014 | Komiya | |
| 2001/0005561 A1 | 6/2001 | Yamada et al. | |
| 2002/0061435 A1* | 5/2002 | Hisai | H01M 2/263 429/94 |
| 2008/0060189 A1* | 3/2008 | Daidoji | H01M 2/021 29/623.1 |
| 2008/0305398 A1* | 12/2008 | Komiya | H01M 6/005 429/246 |
| 2009/0169990 A1 | 7/2009 | Gardner et al. | |
| 2010/0209773 A1 | 8/2010 | Sakashita et al. | |
| 2011/0067227 A1* | 3/2011 | Sohn | H01M 2/22 29/623.1 |
| 2011/0183183 A1 | 7/2011 | Grady et al. | |
| 2012/0164520 A1 | 6/2012 | Choi | |
| 2012/0225345 A1* | 9/2012 | Kim | H01M 2/1653 429/145 |

FOREIGN PATENT DOCUMENTS

| | | |
|---|---|---|
| CN | 101252208 A | 8/2008 |
| CN | 101626094 A | 1/2010 |
| CN | 101630757 A | 1/2010 |
| EP | 1207565 A2 | 5/2002 |
| EP | 1901387 A2 | 3/2008 |
| EP | 2299522 A1 | 3/2011 |
| JP | 2001028275 A | 1/2001 |
| JP | 2001-167743 A | 6/2001 |
| JP | 2010186697 A | 8/2010 |
| JP | 2011077105 A | 4/2011 |
| KR | 20030066960 A | 8/2003 |
| KR | 20080023182 A | 3/2008 |
| KR | 101243591 B1 | 3/2013 |
| WO | 2011/126310 A2 | 10/2011 |

OTHER PUBLICATIONS

JPODecision_to_Grant_a_Patent_(Translated),Sep. 15, 2015.*
Decision_to_grant_a_European_patent,Dec. 8, 2016.*
International Search Report for Application No. PCT/KR2013/004751 dated Oct. 1, 2013.
Search Report from corresponding European Application No. 13797641.1, dated Apr. 10, 2015.

* cited by examiner

ELECTRODE ASSEMBLY HAVING EXCELLENT ELECTRODE TAB CONNECTIVITY AND BATTERY CELL AND DEVICE INCLUDING ELECTRODE ASSEMBLY

CROSS-REFERENCE TO RELATED APPLICATIONS

This application is a Continuation Bypass Application of International Patent Application No. PCT/KR2013/004751, filed May 30, 2013, which claims the priorities of Korean Patent Application Nos. 10-2012-0057583, filed on May 30, 2012, 10-2012-0127001, filed on Nov. 9, 2012, and 10-2013-0061580, filed on May 30, 2013, in the Korean Intellectual Property Office, the disclosures of which are incorporated herein by reference.

BACKGROUND OF THE INVENTION

Field of the Invention

The present invention relates to an electrode assembly having excellent connective properties between electrode tabs and a battery cell and a device including the electrode assembly, and a method of manufacturing the electrode assembly, and more particularly, to an electrode assembly in which connective properties between electrode tabs are improved by arranging electrode tabs having the same polarity such that some thereof do not overlap one another on the same plane and a battery cell and a device including the electrode assembly, respectively, and a method of manufacturing the electrode battery.

Description of the Related Art

Due to development of technologies with respect to mobile devices and increased demand therefor, demand for second batteries has been rapidly increased. Among them, lithium secondary cell batteries having high energy intensity, high operating voltages and having excellent maintenance and lifespan properties are generally used not only in various mobile devices but also as energy sources for various electronic products.

Generally, lithium secondary cell batteries are formed to have a structure of sealing an electrode assembly and an electrolyte are provided in a battery case and are classified, according to external shapes thereof, into cylindrical batteries, square-shaped batteries, and pouch type batteries and may be classified, according to the form of the electrolyte, into lithium ion batteries, lithium ion polymer batteries, and lithium polymer batteries. Due to the miniaturization of mobile devices, demand for square-shaped batteries and pouch type batteries having reduced thicknesses is increased, and particularly, pouch type batteries of which shapes thereof are easily able to be changed and having small weights have attracted attention.

On the other hand, electrode assemblies contained in battery cases may be classified, according to forms thereof, into a jelly-roll type structure, a stacked type structure, and a stacked and folded structure. Generally, jelly-roll type electrode assemblies are manufactured by coating metal foil used as current collectors with electrode active materials, pressing and cutting the same to be bands having desired widths and lengths, partitioning anodes and cathodes by using separation films, and then spirally winding the bands. Stacked type electrode assemblies are manufactured by vertically stacking an anode, a separation film, and a cathode. On the other hand, stacked and folded type electrode assemblies are manufactured by winding and folding electrode stacks formed of single electrodes or an anode/a separation film/a cathode by using a continuous long sheet type separation films.

Figure 1:
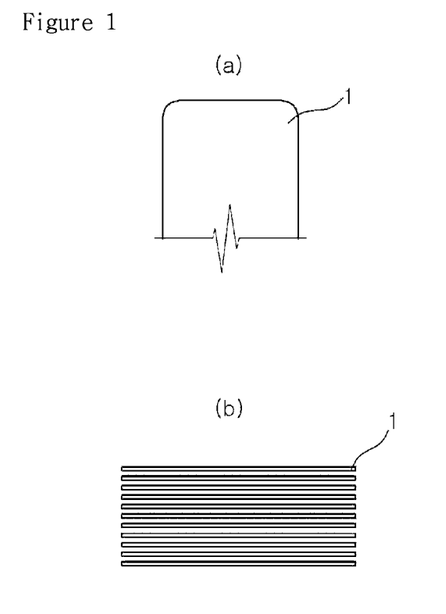
FIG. 1(a) is a top view illustrating general arrangement of electrode tabs.
FIG. 1(b) is a cross-sectional view illustrating the general arrangement of electrode tabs.

On the other hand, electrode assemblies as described above include, for electrical connections, at least one anode tab and at least one cathode tab. Recently, as the number of electrodes included in electrode assemblies has increased, to provide higher degrees of capacitance, the number of electrode tabs included in electrode assemblies has also increased. Electrode tabs are generally connected so as not to be short-circuited before being packed into battery cases. Connected electrode tabs are contained in electrode terminals included in battery cases. To easily perform the connection and packing process as described above, in general, as shown in FIG. 1(b), all electrode tabs 1 having common polarities are arranged in common locations on a plane. However, as the number of electrode tabs included in electrode assemblies increases, when arranging electrode tabs according to general methods as described above, since thicknesses of stacks of electrode tabs may be increased, not only are the connective properties of electrode tabs deteriorated, but also, the sizes of electrode terminals for containing electrode tabs may be increased, to thereby spoil designed shapes of battery cells.

Figure 14:
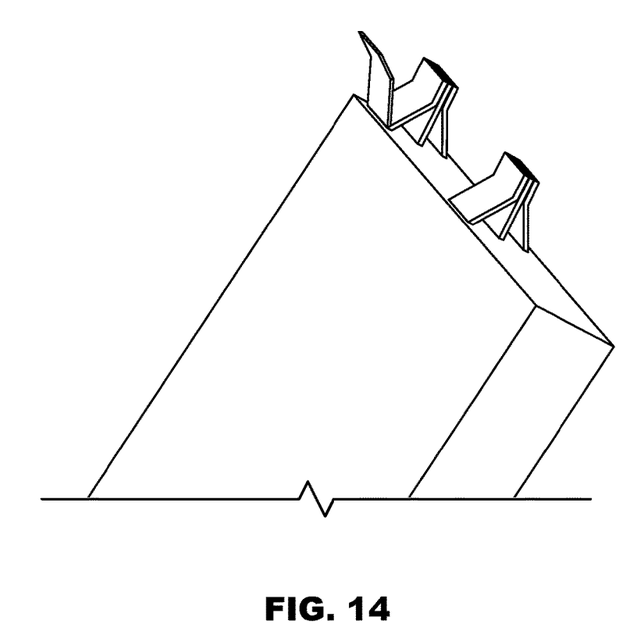
FIG. 14 is a photograph illustrating a connection state of electrode tabs formed by using a general method.

Also, in the case of consuming a large amount of energy to connect a large number of electrode tabs, excessive energy may be transferred to an electrode tab in a highest position, leading to the electrode tab being burned or to causing a deformational defect thereof, such as breaking. Otherwise, to prevent this, when reducing energy for the connection of electrode tabs, electrode tabs located in a lower position may not be fully connected, and may be separated or peeled off. FIG. 14 depicts a state in which electrode tabs are connected to an electrode stack by fifteen unit cells, stacked using a general method. In such configurations, electrode tabs are not perfectly connected, but separated, and some are burned. This means that it is impossible to fully connect electrode tabs to thick electrode assemblies having a large number of electrodes by using general methods.

Accordingly, it is necessary to develop a technology for improving connectivity between electrode tabs in electrode assemblies having a large number of stacks and of manufacturing battery cells having variously designed shapes.

SUMMARY OF THE INVENTION

An aspect of the present invention provides an electrode assembly having excellent connectivity between electrode tabs through a reduction in thickness of stacked electrode tabs and a method of manufacturing the electrode assembly.

According to an aspect of the present invention, there is provided an electrode assembly including an electrode stack including at least one anode, at least one cathode, and at least one separation film and a plurality of cathode tabs and a plurality of anode tabs for electrically connecting the electrode stack. In this case, the electrode tabs are arranged to allow the electrode tabs having the same polarity to be electrically connected to one another while a portion of the electrode tabs having the same polarity are arranged so as not to overlap one another on the same plane.

The electrode tabs may respectively include two or more types of electrode tab having different widths. For example, the electrode tabs may respectively include at least one first electrode tab having a relatively wider width, at least one second electrode tab and at least one third electrode tab having widths narrower than that of the first electrode tab and disposed so as not to overlap each other.

On the other hand, the sum of the widths of the second electrode tab and the third electrode tab may be narrower than the width of the first electrode tab.

On the other hand, the electrode stack may include a combination of two or more types of electrode unit having different areas. In this case, an anode of an electrode unit having a relatively larger area and a cathode of an electrode unit having a relatively smaller area may face each other at a boundary surface between the electrode units having different areas.

On the other hand, the electrode unit may be formed of a single electrode; at least one unit cell including at least one cathode, at least one anode, and at least one separation film; or a combination thereof. In this case, the unit cell is one selected from the group consisting of a jelly-roll type unit cell, a stacked type unit cell, and a stacked and folded type unit cell.

Portions or the entirety of single electrodes and unit cells forming the electrode units are surrounded by at least one long sheet type separation film.

According to another aspect of the present invention, there is provided a battery cell in which the electrode assembly according to the present invention as described above is built into a battery case. In this case, the battery cell may be one of a lithium ion secondary cell battery and a lithium ion polymer secondary cell battery.

According to another aspect of the present invention, there is provided a device including one or more battery cells as described above. In this case, the device may be one of a cellular phone, a portable computer, a smartphone, a smart pad, a netbook, a light electric vehicle (LEV), an electric vehicle, a hybrid electric vehicle, a plug-in hybrid electric vehicle, and a power storage device.

According to another aspect of the present invention, there is provided a method of manufacturing an electrode assembly including an electrode stack including at least one anode, at least one cathode, and at least one separation film and a plurality of cathode tabs and a plurality of anode tabs for electrically connecting the electrode stack, the method including arranging the electrode tabs to allow the electrode tabs having the same polarity to be electrically connected to one another while a portion of the electrode tabs having the same polarity are arranged so as not to overlap one another on the same plane. The method may further include the operation of connecting the electrodes having same polarity. In this case, the connecting may be performed by using an ultrasonic connection method, a laser connection method, a resistance welding method, and a combination thereof.

DETAILED DESCRIPTION OF THE PREFERRED EMBODIMENT

Exemplary embodiments of the present invention will now be described in detail with reference to the accompanying drawings. The following drawings are merely provided for providing a thorough understanding of the present invention and only illustrate exemplary embodiments of the present invention. The scope of the present invention is not limited thereto. Also, throughout the drawings, like reference numerals designate like elements. Some elements may be exaggerated, reduced, or omitted to allow the present invention to be easily understood.

In the present embodiment, there is provided an electrode assembly including an electrode stack including at least one anode, at least one cathode, and at least one separation film and a plurality of cathode tabs and a plurality of anode tabs for electrically connecting the electrode stack, in which the electrode tabs are arranged in such a manner that electrode tabs having the same polarity are electrically connected to one another and some thereof do not overlap one another on the same plane.

In this case, "being arranged not to allow some of the electrode tabs having the same polarity to overlap one another" means "being arranged in such a manner that, when projecting the electrode tabs having the same polarity on a single plane, generally, to a plane of an electrode assembly in a horizontal direction, some thereof do not overlap one another." When being arranged not to allow some of the electrode tabs to overlap one another according to the present embodiment, although using the same number of electrode tabs, since a thickness of being connected is reduced, a deterioration of connectivity caused by an increase of the thickness of stacked electrode tabs is prevented. Merely, to allow the electrode tabs having the same polarity to maintain electric connection therebetween, a portion of the electrode tabs having the same polarity may overlap one another.

On the other hand, in the present embodiment, the electrode tabs may include two or more types of electrode tab having different widths. That is, the electrode tabs may include electrode tabs having a relatively wide width and electrode tabs having a relatively narrow width. When including two or more types of electrode tab having different widths as described above, electric connections among the electrode tabs having the same polarity may be maintained while reducing the thickness stacked the electrode tabs.

Figure 2:
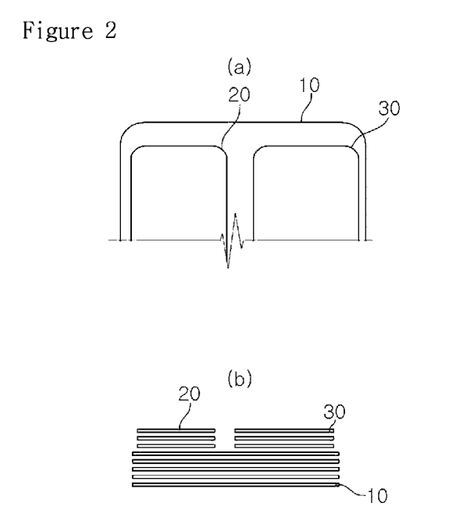
FIG. 2(a) is a top view illustrating arrangement of electrode tabs according to an embodiment of the present invention.
FIG. 2(b) is a cross-sectional view illustrating the arrangement of the electrode tabs shown in FIG. 2(a)
Figure 3:
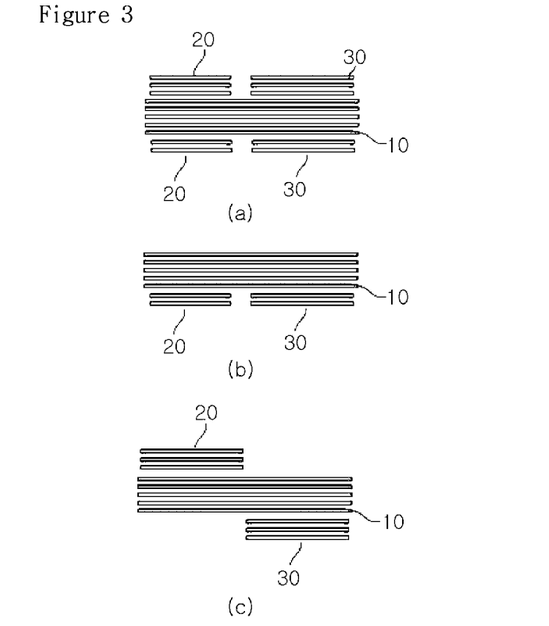
FIGS. 3(a), 3(b), 3(c), and 4 are cross-sectional views illustrating various arrangements of electrode tabs according to embodiments of the present invention.
Figure 4:
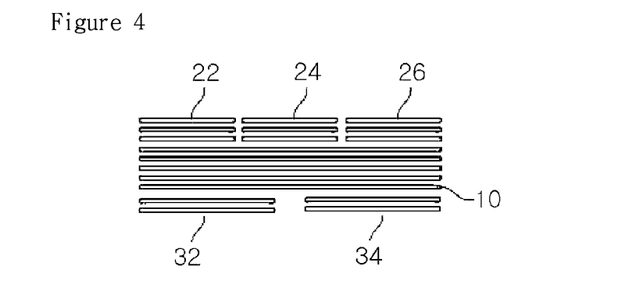

FIGS. 2(a) to 4 illustrate various examples of arrangements of electrode tabs. Referring to FIG. 2) to 4, the electrode tabs may include at least one first electrode tab 10 having a relatively wide width, at least one second electrode tab 20 and at least one third electrode tab 30 having narrower widths than that of the first electrode tab 10. In this case, the second electrode tab 20 and the third electrode tab 30 are arranged so as not to overlap each other on the same plane and the respective second electrode tab 20 and the third electrode tab 30 are arranged to overlap the first electrode tab 10 on the same plane. In this case, the widths of the second electrode tab 20 and the third electrode tab 30 may be same or different. FIGS. 2(a), 2(b), 3(a), and 3(b) illustrate the second electrode tab 20 and the third electrode tab 30 having different widths, and FIGS. 3(c) and 4 illustrate the second electrode tab 20 and the third electrode tab 30 having the same width.

On the other hand, the second electrode tab 20 and the third electrode tab 30 are arranged just for overlapping the first electrode tab 10 but it is unnecessary that the second electrode tab 20 and the third electrode tab 30 are entirely included in an area of the first electrode tab 10. Also, parts of the second electrode tab 20 and the third electrode tab 30 may be outside of the area of the first electrode tab 10. Merely, to reduce a space occupied by electrode tabs, the sum of the widths of the second electrode tab 20 and the third electrode tab 30 may be narrower than the width of the first electrode tab 10. When the space occupied by the electrode tabs is large, an electrode lead containing the electrode tabs become longer, which has a bad effect on an external appearance.

On the other hand, in the present embodiment, a stacking order of the first electrode tab 10, the second electrode tab 20, and the third electrode tab 30 is not limited. For example, in the present embodiment, the electrode tabs may be arranged, as shown in FIG. 2(b), to have a structure in which the second electrode tab 20 and the third electrode tab 30 are arranged on the first electrode tab 10, as shown in FIG. 3(a), to have a structure in which the first electrode tab 10 is located in the center and the second electrode tab 20 and the third electrode tab 30 are arranged on a top and a bottom of the first electrode tab 10, and as shown in FIG. 3(b), to have a structure in which the first electrode tab 10 is arranged on the top of the second electrode tab 20 and the third electrode tab 30. Also, as shown in FIG. 3(c), the second electrode tab 20 is arranged on the bottom of the first electrode tab 10 having the relatively wider width and the third electrode tab 30 is arranged on the top of the first electrode tab 10. Also, as shown in FIG. 4, second electrode tabs 22, 24, and 26 are arranged on one side of the first electrode tab 10 and third electrode tabs 32 and 34 are arranged on a bottom surface of the first electrode tab 10. Additionally, various modified examples may be provided, which should be understood as being included in the scope of the present invention.

Also, as shown in FIG. 4, the electrode tabs may include three or more types of electrode tab 22, 24, 26, 32, and 34 having smaller widths than that of the first electrode tab 10.

As described above, when the electrode tabs include different widths, various arrangements of electrode tabs may be provided, thereby overcoming various limitations in connecting general electrode tabs and providing beautiful designs. For example, in general, electrode tabs are pressed vertically to connect with one another. When using a connection method as described above, an electrode tab connected to a highest part is excessively elongated to be torn and damaged. However, when using the structures as shown in FIGS. 3(a) and 3(b) in which the second electrode tab 20 and/or the third electrode tab 30 are arranged on the top and the bottom of the first electrode tab 10, the electrode tabs may be connected while being simultaneously or sequentially pressed from the top and the bottom, thereby preventing excessive elongations of electrode tabs connected to a highest part and a lowest part of the electrode stack. Also, connection positions of electrode tabs may be freely controlled as described above, a location of an electrode terminal formed on a battery case may be freely controlled, which allows various designs to be provided.

On the other hand, FIGS. 2(a) to 4 are views to describe the arrangement of the electrodes having the same polarity. The electrode assembly according to the present embodiment includes two electrode tabs having the arrangement as described above, that is, a cathode tab and an anode tab. In this case, the arrangements of the cathode tab and the anode tab may be the same or different from each other.

On the other hand, as long as the electrode tabs are arranged to allow the electrode tabs having the same polarity to be electrically connected to one another, locations for forming the cathode tab and the anode tab are not particularly limited. In other words, in the present embodiment, the cathode tab and the anode tab may be formed to be parallel to one side of one of directions of the length and the width of the electrode stack and may be formed on different sides, respectively.

Next, in the present embodiment, the electrode stack is a structure including at least one anode, at least one cathode, and at least one separation film and is not particularly limited. In other words, in the present embodiment, the electrode stack may have a form in which an anode and a cathode, which are single electrodes, are alternately stacked while a separation film is interposed therebetween, a form in which unit cells formed of an anode, a cathode, and a separation film are stacked, a form in which single electrodes and/or unit cells are bound with a long sheet type separation film, and a form in which unit cells and single cells are combined.

In this case, the unit cell should be understood as a concept including all electrode structures manufactured by using a jelly-roll method of partitioning a sheet type anode and a sheet type cathode by using a separation film and spirally winding the same, a stack method of sequentially stacking at least one anode, at least one separation film, and at least one cathode, and a stacking and folding method of arranging single electrodes and/or stacked type unit cells on a long sheet type separation film and folding the same. Through the present specification, for convenience, a unit cell manufactured by using the jelly-roll method will be designated as a jelly-roll type unit cell, a unit cell manufactured by using the stack method will be designated as a stacked type unit cell, and a unit cell manufactured by using the stacking and folding method will be designated as a stacked and folded type unit cell.

On the other hand, in the present specification, the term of "the stacked type" is a concept including not only being manufactured by using a typical method of sequentially stacking a cathode, a separation film, and an anode one by one but also a laminated and stacked method of manufacturing basic units having a sequential stack structure such as an anode/a separation film/a cathode/a separation film or a cathode/a separation film/an anode/a separation film and stacking the basic units while a separation film is interposed therebetween. In this case, the basic units may include two or more cathodes and anodes and one of outmost sides of the basic unit may be formed of a separation film and another thereof may be formed of an electrode. A electrode stack manufactured by using the laminated and stacked method may be formed of not only basic units as described above but also an electrode structure and/or a separation film in addition to the basic units. For example, the electrode stack manufactured by using the laminated and stacked method may use one of a separation film and an electrode structure formed of one of a separation/a cathode/a separation film and a separation film/an anode/a separation film as a highest part or a lowest part thereof and may include the basic units as other parts. The electrode stack manufactured by using the laminated and stacked method may include cathodes and anodes whose sum of numbers is same as the number of separation films and may include added separation films at the outmost sides of the electrode stack in such a way that the number of separation films is greater than the sum of the total of cathodes and anodes by one.

On the other hand, the term of "the stacked and folded type" designates a method of arranging single electrodes and/or stacked type unit cells on a long sheet type separation film and folding the same. A folding method is not particularly limited and will be understood as including all methods well-known to those of ordinary skill, such as a method Z-folding type of folding a sheet type separation film as a zigzag shape, a winding method of arranging stacked type unit cells on one side of a sheet type separation film and winding the same in one direction, and a method of alternately arranging single electrodes on both side of a sheet type separation film and winding the sheet type separation film to be rolled.

On the other hand, materials of cathodes, anodes, and separations films included in the electrode stack in the present embodiment are not particularly limited and may use cathodes, anodes, and separation films well known to those of ordinary skill in the art with no limitation. For example, the anode may be formed by coating an anode current collector manufactured by using one of copper, nickel, aluminum and an alloy including at least one thereof with an anode active material such as lithium metals, lithium alloys, carbon, petroleum cokes, activated carbon, graphite, silicon compounds, tin compounds, and an alloy thereof. Also, the cathode may be formed by coating a cathode current collector manufactured by using one of aluminum, nickel, copper and an alloy including at least one thereof with a cathode active material such as lithium manganese oxides, lithium cobalt oxides, lithium nickel oxides, lithium iron phosphate, and a compound and a mixture including at least one thereof. In this case, areas of a cathode and an anode forming one unit cell, the areas being coated with electrode active materials, may be same or may be different. Also, both sides of a current collector may be coated with the electrode active material or one side of the current collector may be coated with the electrode active material to form an uncoated part. According to necessity, a part or the entire of a surface of the current collector may be coated.

On the other hand, the separation film, for example, may be a multilayer film manufactured by using one of polyethylene, polypropylene, and a combination thereof having micro porous structures or may be a polymer film for a solid polymer electrolyte or a gel type polymer electrolyte, such as polyvinylidene fluoride, polyethylene oxide, polyacrylonitrile, polyvinylidene fluoride hexafluoropropylene copolymer.

On the other hand, in the present embodiment, sizes or shapes of the single electrodes and/or unit cells included in the electrode stack are not particularly limited. That is, the single electrodes and/or unit cells included in the electrode stack may have same shapes and/or sizes or may have different shapes and/or sizes. When the single electrodes and/or unit cells included in the electrode stack include different sizes or shapes, more various shapes may be provided.

For example, the electrode stack may include a combination of two or more types of electrode unit having different areas, in which the electrode units are stacked to form a step therebetween. In this case, the areas designate surface areas in a vertical direction (hereinafter, referred to as a planar direction) to a direction of stacking the electrode units.

Also, "the electrode unit" designates a basic unit forming one layer in the electrode stack having a step, and each of the electrode units may be formed of single electrodes such as anodes or cathodes, at least one unit cell, and a combination thereof.

On the other hand, when including the combination of the two or more types of electrode unit having different areas, electrodes having different polarities face one another at a boundary surface between the electrode units having different areas. When disposing electrodes having different polarities at the boundary surface between the electrode units having different areas, electricity may be stored at the boundary surface between the electrode units, thereby increasing electric capacity. Particularly, an anode of an electrode unit having a relatively large area and a cathode of an electrode unit having a relatively small area may face one another. When a cathode of the electrode unit having a relatively large area is disposed at the boundary surface between the electrode units having different areas, a lithium metal is precipitated from the cathode of the electrode unit having a relatively large area, thereby reducing a life cycle of a battery or deteriorating safety of the battery. Meanwhile, since the term of "facing" means being disposed oppose one another, two facing electrodes may not be in contact with each other. The term is a concept including a case of interposing other elements between the two electrodes, for example, a separation film and/or a sheet type separation film.

On the other hand, the electrode units forming the electrode stack may be formed of various combinations. Hereinafter, a configuration of the electrode unit will be described in detail with reference to the drawings. FIGS. 5 to 10 illustrate various configurations of the electrode unit in the electrode stack according to exemplary embodiments of the present invention.

Figure 5:
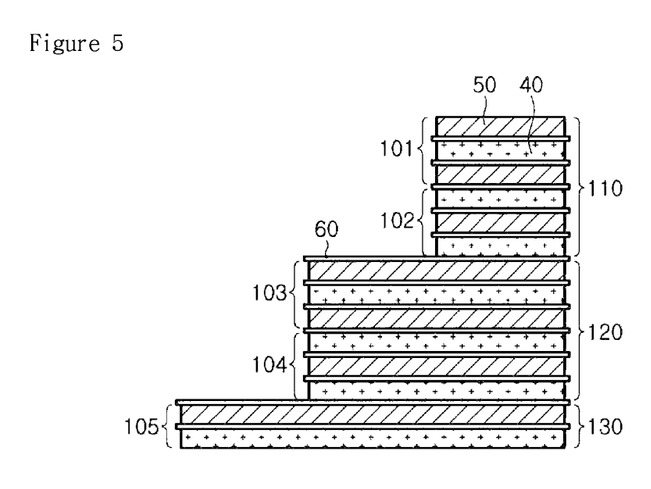
FIG. 5 is a side view illustrating an electrode stack according to an embodiment of the present invention.

For example, in FIG. 5, there is shown an electrode stack including an electrode unit formed of stacked type unit cells according to an embodiment of the present invention. As shown in FIG. 5, the electrode stack may be formed of three types of electrode unit 110, 120, and 130 having different areas. In this case, the electrode units may include stacked type unit cells in each of which a cathode 40 and an anode 50 are stacked with a separation film 60 interposed therebetween. In this case, each of the electrode units may be formed of one unit cell 105 such as an electrode unit 130, may be formed of a combination of two or more unit cells 101, 102, 103, and 104 having same areas such as electrode units 110 and 120. Meanwhile, although all the unit cells forming the electrode unit are stacked type unit cells in FIG. 5, the present invention is not limited thereto. That is, in the present embodiment, the electrode unit may be formed of jell-roll type unit cells, stacked and folded type unit cells, a combination of the unit cells and single electrodes, or a combination of different types of unit cells, in addition to the stacked type unit cells.

Figure 6:
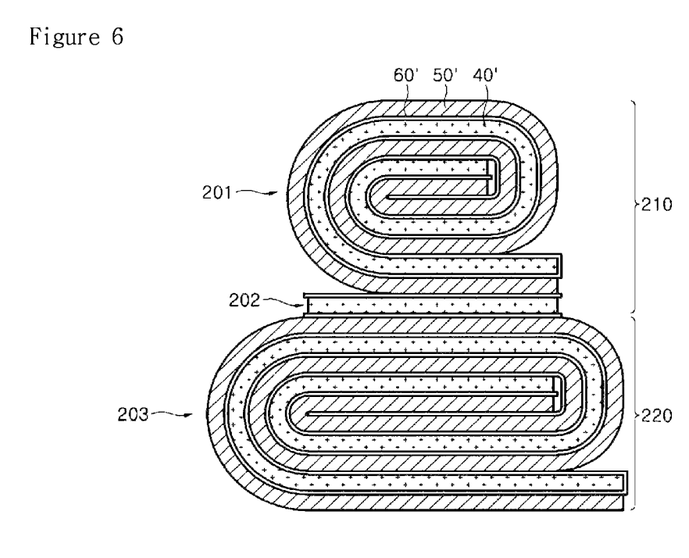
FIG. 6 is a side view illustrating an electrode stack according to another embodiment of the present invention.

For example, in FIG. 6, there is shown an electrode stack including electrode unit formed of a combination of jelly-roll type unit cells and single electrodes. As shown in FIG. 6, the electrode stack may be formed of, for example, two types of electrode unit 210 and 220 having different areas. In this case, the electrode unit 210 having a relatively small area may be formed of a combination of a jelly-roll type unit cell 201 and a single electrode 202 and the electrode unit 220 having a relatively large area may be formed of a jelly-roll type unit cell 203. In this case, the jelly-roll type unit cells 201 and 203 may be formed by winding an anode sheet 50' and a cathode sheet 40' with a separation film 60' interposed therebetween. Considering the safety of a battery, the anode sheet 50' may be on the outside. The single electrode 202 may be a cathode. Meanwhile, although there are shown the electrode unit 210 formed of the combination of the jelly-roll type unit cell and the single electrode 202 and the electrode unit 220 formed of one jelly-roll type unit cell 203 in FIG. 6, the present invention is not limited thereto. One electrode unit may be formed by combining a stacked type unit cell and/or a stacked and folded type unit cell and a single electrode or may be formed of combining two or more different types of unit cells.

Figure 7:
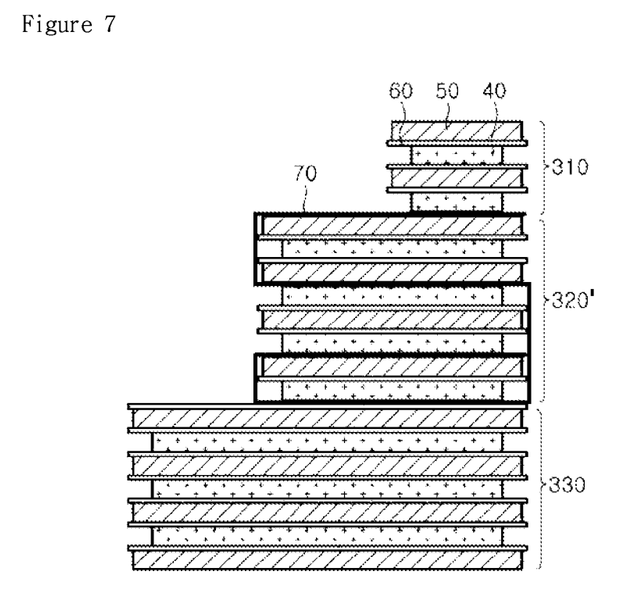
FIG. 7 is a side view illustrating an electrode stack according to another embodiment of the present invention.

For example, as shown in FIG. 7, the electrode stack may be formed of combining stacked type unit cells and stacked and folded type unit cells. As shown in FIG. 7, the electrode stack may be formed of three different types of electrode unit 310, 320, and 330. In this case, the electrode unit 310 having a smallest area and the electrode unit 330 having a largest area may be formed of stacked type unit cells and the electrode unit 320 having an intermediate area may be formed of stacked and folded type unit cells. The electrode unit 310 having the smallest area among them may be formed of a stacked type unit cell having a structure of an anode 50/a separation film 60/a cathode 40/a separation film 60/an anode 50/a separation film 60/and a cathode 40, and the electrode unit 330 having the largest area may be formed of a stacked type unit cell having a structure of an anode 50/a separation film 60/a cathode 40/a separation film 60/an anode 50/a separation film 60/a cathode 40/a separation film 60/an anode 50. As described above, the unit cell may have electrodes having different polarities to be disposed on both outmost sides or may have electrodes having the same polarity to be disposed thereon. One unit cell may include one or more cathodes and/or one or more anodes. Meanwhile, the electrode unit 320 having the intermediate area may be formed a stacked and folded type unit cell in which electrode stacks including an anode, a cathode, and a separation film are bound by a sheet type separation film 70 and stacked.

Figure 8:
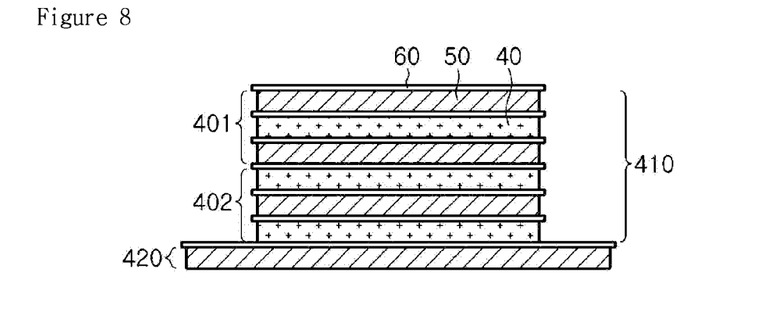
FIG. 8 is a side view illustrating an electrode stack according to another embodiment of the present invention.

On the other hand, FIG. 8 illustrates an electrode stack including an electrode unit 420 formed of a single electrode and an electrode unit 410 formed of one or more unit cells 401 and 402.

Figure 9:
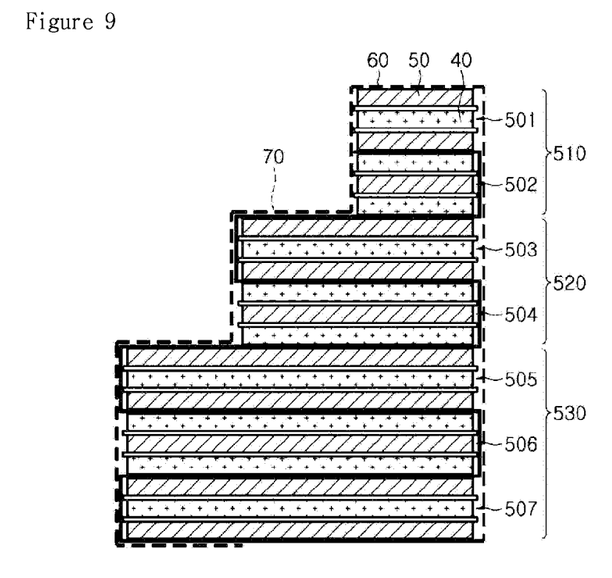
FIG. 9 is a side view illustrating an electrode stack according to another embodiment of the present invention.

On the other hand, the electrode stack may have a structure in which portions or the entirety of single electrodes and unit cells forming electrode units are surrounded by at least one sheet type separation film. FIG. 9 illustrates an example of the electrode stack configured to have a structure in which portions or the entirety of single electrodes and unit cells forming electrode units are surrounded by a sheet type separation film. As shown in FIG. 9, when surrounding unit cells 501, 502, 503, 504, 505, 506, and 507 forming electrode units 510, 520, and 530 by using the sheet type separation film 70, an effect of restraining expansion of a battery is provided by the sheet type separation film 70, thereby more increasing the safety of the battery. Meanwhile, parts shown in dotted lines in FIG. 9 do not need the sheet type separation film 70.

On the other hand, although the sheet type separation film 70 surrounds the stacked type unit cells 501, 502, 503, 504, 505, 506, and 507 in a zigzag shape, the present invention is not limited thereto. Various methods of surrounding a single electrode and/or unit cells by using a sheet type separation film may be provided.

Figure 10:
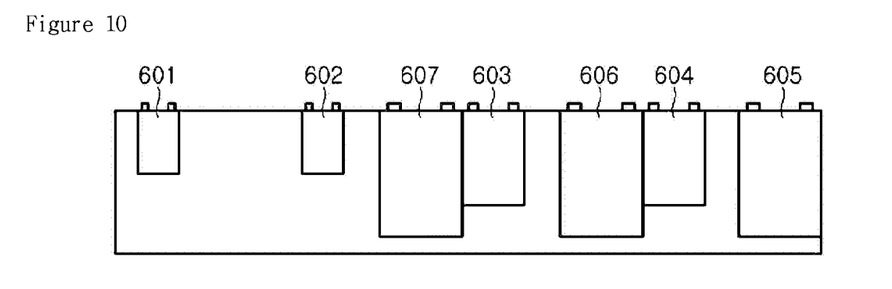
FIG. 10 is a planar view illustrating an electrode stack laid flat according to another embodiment of the present invention.

For example, as shown in FIG. 10, stacked type unit cells 601, 602, 603, 604, 605, 606, and 607 are arranged with proper intervals on the sheet type separation film 70 and the sheet type separation film 70 are wound, thereby manufacturing the electrode stack.

Also, although not shown in the drawing, cathodes are arranged with certain intervals on one side of a sheet type separation film, anodes are arranged with a certain interval therebetween on another side thereof, and the sheet type separation film is wound, thereby manufacturing the electrode stack. Two sheet type separation films are prepared, anodes are stacked in a certain array on one of the two sheet type separation films, cathodes are stacked in a certain array on another thereof, and the two sheet type separation films are wound together, thereby manufacturing the electrode stack. In addition, methods of surrounding portions or the entirety of electrode units by using a sheet type separation film may exist variously according to shapes of electrode stacks to be manufactured, which should be understood as being included in the scope of the present invention.

As described above, in the electrode stack, one electrode unit may be formed of a single electrode, at least one unit cell, or a combination thereof. In this case, as the unit cell, various unit cells generally used by those of ordinary skill, for example, stacked type unit cells, jelly-roll type unit cells, stacked and folded type unit cells and/or a combination thereof may be used with no limitation.

Also, the electrode stack may be formed of, as shown in FIGS. 6 and 8, two types of electrode unit having different areas or may be formed of, as shown in FIGS. 5, 7, and 9, three types of electrode unit having different areas. Also, although not shown in the drawing, the electrode stack may be formed of four or more types of electrode unit having different areas.

In addition to the shown in FIGS. 5 to 10, combinations of various electrode units may exist, which should be understood as being included in the scope of the present invention.

On the other hand, the electrode units included in the electrode stack may have same shape or may have different shapes. For example, the electrode units may be formed as a tetragonal shape such as a rectangle, a square, a trapezoid, a parallelogram, and a diamond, may be formed as a tetragonal shape with one or more corners cut off or formed of curves, or may be a shape having one or more edges formed of curves. In addition, electrode units having various shapes may exist, which should be understood as being included in the scope of the present invention. As described above, shapes of the electrode units are variously formed, thereby not only providing batteries having various designs but also increasing space utilization.

Figure 11:
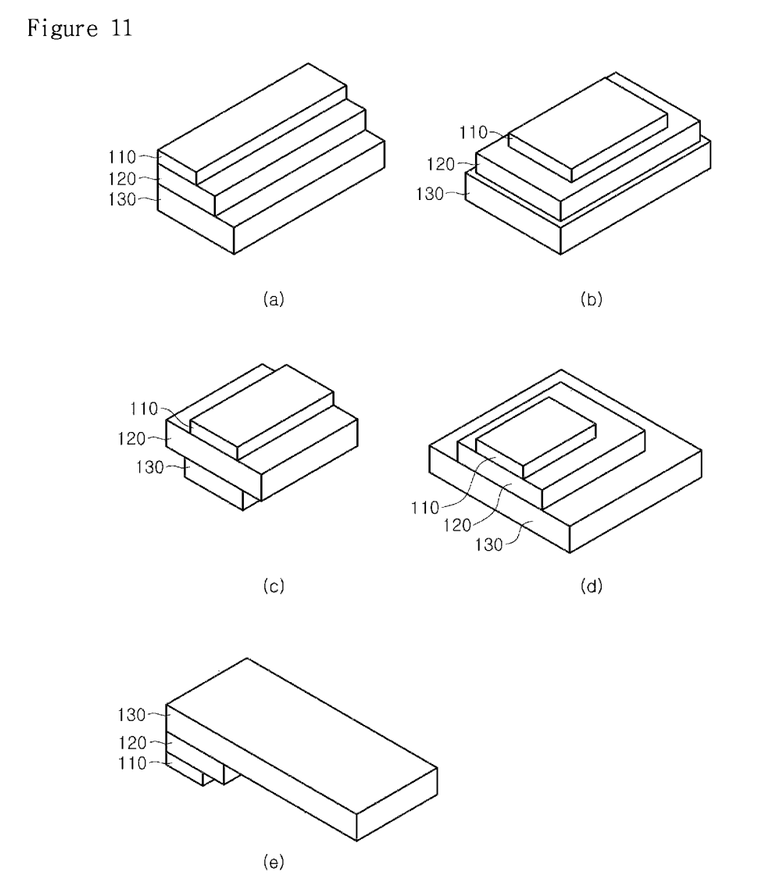
FIGS. 11(a) to 11(e) are views illustrating examples of stacking electrode units according to an embodiment of the present invention.

On the other hand, in the present embodiment, two or more types of electrode unit having different areas may be stacked in various arrays. A method of stacking the electrode units is not particularly limited. For example, as shown in FIGS. 11(a), 11(b), and 11(d), the electrode units may be stacked in an array in which areas of the electrode units become smaller in a direction from a bottom to a top. As shown in FIG. 11(e), the electrode units may be stacked in an array in which areas of the electrode units become larger in a direction from a bottom to a top. Otherwise, as shown in FIG. 11(c), the electrode units may be stacked in such a way that an electrode unit having a largest area is arranged as an intermediate layer of the electrode stack.

Also, in the electrode stack, the electrode units, for example, as shown in FIG. 11(a), may be stacked in a step array in which edges of the respective electrode units coincide with one another. As shown in FIG. 11(b), the electrode units may be stacked in a pyramidal array in which central points of the respective electrode units in a planar direction coincide with one another. Also, as shown in FIG. 11(d), the electrode units may be stacked in an array in which central points of the respective electrode units are separated from one another with certain intervals or irregularly. In addition, stack arrays may be variously modified, which should be understood as being included in the scope of the present invention.

On the other hand, when using the electrode stack including two or more different types of electrode unit having different areas, since electric capacity may be different for each electrode unit, electrode tabs optimized for the respective electrode units may be different. Accordingly, when using the electrode stack including two or more different types of electrode unit having different areas, electrode tabs having sizes optimized for capacities of the respective electrode units are selected and the electrode units may be arranged in such a manner that only parts of the electrode tabs overlap one another, thereby increasing connectivity of the electrode tabs, maximizing the electric capacity, and providing various battery designs. Meanwhile, widths of the electrode tabs optimized for the electrode units having different areas may be properly designed by those of ordinary skill in the art, considering various aspects such as capacities of the respective electrode units, capacity of the entire battery, and elements in design, which are not particularly limited. For example, considering the safety of a battery and current intensity, the width of the electrode unit may be designed to allow a ratio of a vertical cross-section of an electrode tab, that is, a width (m)×a thickness (m) of the electrode tab to capacity (A) of the electrode unit to be 0.015 or more.

On the other hand, an electrode assembly according to an embodiment of the present invention may be manufactured by using a method including arranging the electrode tabs in such a manner that the electrode tabs having the same polarity are electrically connected to one another while arranging some of the electrode tabs having the same polarity so as not to overlap one another. The arrangement of the electrode tabs as described above may be performed by controlling locations forming the electrode tabs at a single electrode and/or a unit cell. Meanwhile, detailed configurations of the electrode assembly and electrode tabs are the same as described above, and descriptions thereof will be omitted.

On the other hand, the method of manufacturing the electrode assembly may further include connecting the electrode tabs having the same polarity to one another. The connecting the electrode tabs is to insert the electrode tabs into an electrode lead after packing a battery case. In this case, the connection may be performed by using, for example, an ultrasonic connection method, a laser connection method, a resistance welding method, and a combination thereof. A detailed connection condition may be properly changed by a designer according to a thickness of stacked electrode tabs or the number of steps thereof.

Figure 12:
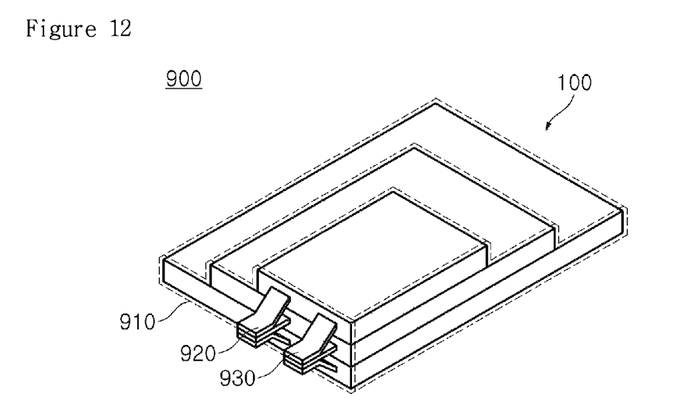
FIG. 12 is a perspective view illustrating a battery cell according to an embodiment of the present invention.
Figure 13:
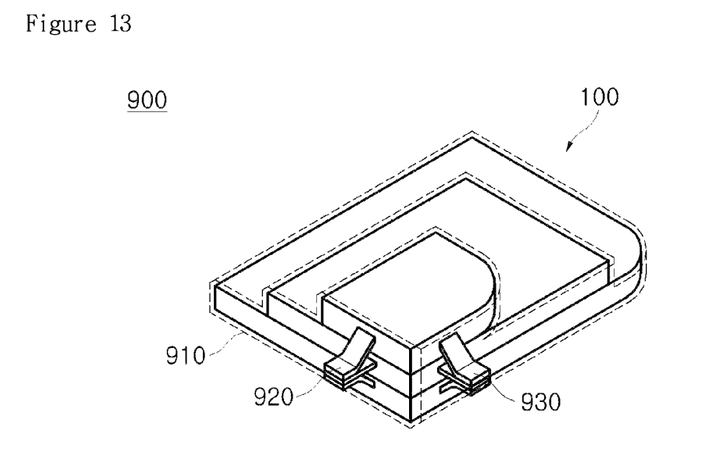
FIG. 13 is a perspective view illustrating a battery cell according to another embodiment of the present invention.

Next, a battery cell 900 according to an embodiment of the present invention will be described. FIGS. 12 and 13 illustrate an example of the battery cell 900. As shown in FIGS. 12 and 13, the battery cell 900 includes an electrode assembly 100 built into a battery case 910.

In this case, the battery case 910 may be a pouch type case and may have a shape corresponding to a shape of the electrode assembly 100 but is not limited thereto.

On the other hand, the pouch type case may be formed of a laminate sheet. In this case, the laminate sheet may be formed of an external resin layer forming an outmost side, a shielding metal layer preventing a penetration of materials, and an inner resin layer for sealing but is not limited thereto.

Also, the battery case may be formed to have a structure in which electrode leads 920 and 930 for electrically connecting electric terminals of electrode units of the electrode assembly 100 are exposed outwardly. Although not shown in the drawing, insulation films may be attached to top and bottom surfaces of the electrode leads 920 and 930 to protect the electrode leads 920 and 930. Meanwhile, in the present embodiment, the electrode leads may be formed in various locations according to locations for forming cathode tabs and anode tabs. For example, as shown in FIG. 12, the cathode lead 920 and the anode lead 930 may be formed in parallel on one side of the electrode assembly 100. As shown in FIG. 13, the cathode lead 920 and the anode lead 930 may be formed on different sides.

Also, the battery case may be formed to have a shape corresponding to the shape of the electrode assembly 100 and the shape of the battery case may be formed by modifying the battery case itself. In this case, the shape and size of the battery case are not necessary to perfectly coincide with the shape and size of the electrode assembly 100. A shape and a size capable of preventing an inside short-circuit caused by sliding of the electrode assembly are appropriate. Meanwhile, the shape of the battery case is not limited thereto and battery cases having various shapes and sizes may be used according to necessity.

On the other hand, the battery cell may be one of a lithium ion battery and a lithium ion polymer battery but is not limited thereto.

The battery cell as described above may be used independently and may be used as a battery pack including at least one battery. The battery cells and/or the battery packs may be appropriately used for cellular phones, portable computers, smartphones, smart pads, netbooks, light electric vehicles (LEVs), electric vehicles, hybrid electric vehicles, plug-in hybrid electric vehicles, or power storage devices. Since structures of such devices and methods of manufacturing the devices are well known to those of ordinary skill, detailed descriptions thereof will be omitted.

On the other hand, when mounting the battery cells or the battery packs on the devices, system components of the devices may be allowed to be located in redundant spaces formed due to structures of the battery cells or the battery packs. Since the battery cells or the battery packs are formed of electrode assemblies having different sizes, the electrode assemblies themselves are formed to have steps. When battery cases are formed to correspond to shapes of electrodes and mounted on the devices, redundant spaces are formed, which do not exist in typical square-shaped or oval battery cells or battery packs. When mounting system components of the devices in such redundant spaces, since system components of the devices and battery cells or battery packs may be flexibly arranged, space utilization may increase and slim designs may be provided by reducing thickness or volumes of the entire devices.

While the present invention has been shown and described in connection with the exemplary embodiments, it will be apparent to those skilled in the art that modifications and variations can be made without departing from the spirit and scope of the invention as defined by the appended claims.

What is claimed is:

1. An electrode assembly comprising an electrode stack comprising at least one anode, at least one cathode, and at least one separation film and a plurality of cathode tabs and a plurality of anode tabs for electrically connecting the electrode stack,
   wherein the electrode tabs are arranged to allow the electrode tabs having the same polarity to be electrically connected to one another while a portion of the electrode tabs having the same polarity are arranged so as not to overlap one another on the same plane,
   wherein the electrode stack comprises a combination of two or more types of electrode unit having different areas which designate surface areas in a vertical direction to a direction of stacking the electrode units, and
   wherein an anode of an electrode unit having a larger area and a cathode of an electrode unit having a smaller area face each other at a boundary surface between the electrode units having different areas.

2. The electrode assembly of claim 1, wherein the electrode tabs comprise two or more electrode tabs having different widths.

3. The electrode assembly of claim 2, wherein the electrode tabs each comprises:
   at least one first electrode tab having a width; and
   at least one second electrode tab and at least one third electrode tab having widths narrower than that of the first electrode tab and disposed so as not to overlap each other.

4. The electrode assembly of claim 3, wherein the sum of the widths of the second electrode tab and the third electrode tab is narrower than the width of the first electrode tab.

5. The electrode assembly of claim 1, wherein the electrode unit is formed of a single electrode; or
   at least one unit cell comprising at least one cathode, at least one anode, and a least one separation film; or
   a combination thereof.

6. The electrode assembly of claim 5, wherein the unit cell is one selected from the group consisting of a jelly-roll type unit cell, a stacked type unit cell, and a stacked and folded type unit cell.

7. The electrode assembly of claim 1, wherein portions or the entirety of single electrodes and unit cells forming the electrode units is surrounded by at least one long sheet type separation film.

8. A battery cell in which the electrode assembly according to claim 1 is built into a battery case.

9. The battery cell of claim 8, being one of a lithium ion secondary cell battery and a lithium ion polymer secondary cell battery.

10. A device comprising one or more battery cells of claim 8.

11. The device of claim 10, being one of a cellular phone, a portable computer, a smartphone, a smart pad, a netbook, a light electric vehicle (LEV), an electric vehicle, a hybrid electric vehicle, a plug-in hybrid electric vehicle, or a power storage device.

* * * * *